(12) United States Patent
Brothers, III

(10) Patent No.: US 11,669,736 B2
(45) Date of Patent: Jun. 6, 2023

(54) EXECUTING NEURAL NETWORKS ON ELECTRONIC DEVICES

(71) Applicant: Arm Limited, Cambridge (GB)

(72) Inventor: John Wakefield Brothers, III, Calistoga, CA (US)

(73) Assignee: Arm Limited, Cambridge (GB)

(*) Notice: Subject to any disclaimer, the term of this patent is extended or adjusted under 35 U.S.C. 154(b) by 413 days.

(21) Appl. No.: 16/836,408

(22) Filed: Mar. 31, 2020

(65) Prior Publication Data

US 2021/0303992 A1  Sep. 30, 2021

(51) Int. Cl.
*G06N 3/08* (2023.01)
*G06N 3/04* (2023.01)

(52) U.S. Cl.
CPC ............ *G06N 3/08* (2013.01); *G06N 3/04* (2013.01)

(58) Field of Classification Search
CPC .......... G06N 3/08; G06N 3/04; G06N 3/0454; G06N 3/0481; G06N 3/063
See application file for complete search history.

(56) References Cited

U.S. PATENT DOCUMENTS

| | | | |
|---|---|---|---|
| 10,699,190 B1* | 6/2020 | Rotem | G06N 3/08 |
| 2019/0138567 A1* | 5/2019 | Martin | G06F 7/5443 |
| 2019/0187963 A1* | 6/2019 | Bokhari | G06F 9/4881 |
| 2020/0066006 A1* | 2/2020 | Dwivedi | G06N 20/00 |
| 2020/0372328 A1* | 11/2020 | Larzul | G06N 3/082 |

* cited by examiner

*Primary Examiner* — Kiet M Doan
(74) *Attorney, Agent, or Firm* — Vierra Magen Marcus LLP

(57) ABSTRACT

When performing neural network processing, the order in which the neural network processing is to be performed is determined, and the order in which weight values to be used for the neural network processing will be used is determined based on the determined order of the neural network processing. The weight values are then provided to the processor that is to perform the neural network processing in the determined order for the weight values, with the processor, when performing the neural network processing, then using the weight values in the determined order that they are provided to the processor.

18 Claims, 10 Drawing Sheets

EXECUTING NEURAL NETWORKS ON ELECTRONIC DEVICES

BACKGROUND

The technology described herein relates to the execution of neural networks on electronic devices, and in particular to the handling of "weights" (weight values) when performing neural network processing on an electronic device.

Neural networks can be used for processes such as machine learning, computer vision, and natural language processing operations. It is becoming increasingly common for neural networks to be employed in portable electronic devices, such as mobile phones, tablets and other devices for these purposes.

Neural networks generally comprise a number of layers which each process an input data array to provide an output data array (which becomes the input data array for the next layer). The layers, acting one after the other, may be able to process complex data (e.g. image or sound data) to provide a desired output (e.g. the identification of an object within an image, or a spoken word within a sound clip, or some other usable output inferred from the input data). This process is usually known as "inferencing" or "classification".

The different layers of a neural network may perform different operations on the input data arrays that they receive.

Many operations performed by layers of a neural network involve applying a set of so-called "weights" (weight values) to an input data array (an input feature map), to thereby generate a corresponding output data array (output feature map). Such operations using weight values typically multiply data values in the input data array (feature map) with a set of weight values to provide, for example, an output that is a weighted average of the input data array values.

One common neural network layer operation, which is performed by, for example, fully connected neural network layers, that use weight values, is a matrix-vector multiply operation, in which an input vector to be processed by the neural network layer is multiplied by a weight matrix, for example to perform a multiply-accumulate operation to provide a weighted sum of the data points represented by the input vector to generate a data point of an output data array (which will be the output of the neural network layer in question). In such arrangements, the input vector may, e.g., comprise of the order of 4096 data positions (data elements), with the weight matrix correspondingly comprising 4096× 4096 data elements.

Another common neural network layer operation that uses weight values is a convolution operation, which may be performed by a convolutional layer of a convolutional neural network (CNN).

Neural network convolution operations are typically carried out by performing a discrete convolution between a set of input feature maps (arrays) and one or more convolution (filter) kernels (comprising a set of weight values) to generate an output feature map (array).

The input feature map will be a suitable array of data elements. The convolution (filter) kernel will be an array of data elements, with each data element of the array representing a "weight". Each weight value may be determined, for example, during training of the neural network. The size of a convolution (filter) kernel can be selected as desired, but should be not greater than the input feature map.

Calculating the output feature map typically involves "sliding" (convolving) the kernel over the input feature map, such that the kernel is positioned in a different location with respect to the input feature map for each element of the output feature map. At each location that the kernel is positioned with respect to the input feature map, the product of each weight value of the kernel with the value of the corresponding element of the input feature map (i.e. the element-wise multiplication) may be calculated, and the sum of the products may be used as the corresponding output value for the output feature map.

Again, there can be a relatively large number of kernels of weight values that may be needed and used for a given neural network.

Thus, the weight values (the "weights") to be used when executing a given neural network typically comprise relatively large amounts of data, and are frequently too large to be retained in their entirety in local, on chip storage, such that the weights will need to be fetched from main memory when they are to be used.

Accordingly, the use of weight values during neural network execution may typically involve a large amount of data being transferred to and from memory. This increases the power consumption, processing burden, memory requirements and memory bandwidth usage within the device that is implementing the neural network. This can particularly be an issue in the case of lower power portable electronic devices, where processing and storage resources may be more constrained.

For performing neural network processing on an electronic device, a compiler for the neural network processing will determine and configure the order of the neural network processing, for example, in terms of the sequence of layer operations and the traversal order within each layer of the neural network. The compiler may also, for example, cause the appropriate data values, such as input feature maps, and weight values, to be stored in memory for access and use by the processor when executing the neural network.

The compiler will then prepare a sequence of commands, etc., that will cause the neural network processor to perform the neural network processing in the desired layer sequence, etc., and identifying the relevant data to be processed (e.g. to load the required data), including the weight values to be used, at each stage of the process (for example by storing the sequence of commands, etc., in memory, from where they can then be retrieved and executed by the processor that is to perform the neural network processing).

The Applicants believe that there remains scope for improvements to the processing of neural networks on electronic devices, and in particular in relation to the handling of weight values for use when executing a neural network.

BRIEF DESCRIPTION OF THE DRAWINGS

A number of embodiments of the technology described herein will now be described by way of example only and with reference to the accompanying drawings, in which:

FIG. 4 shows schematically an overview of an exemplary neural network that the technology described herein may be used for;

Like reference numerals are used for like components in the Figures, where appropriate.

DETAILED DESCRIPTION

Figure 1:
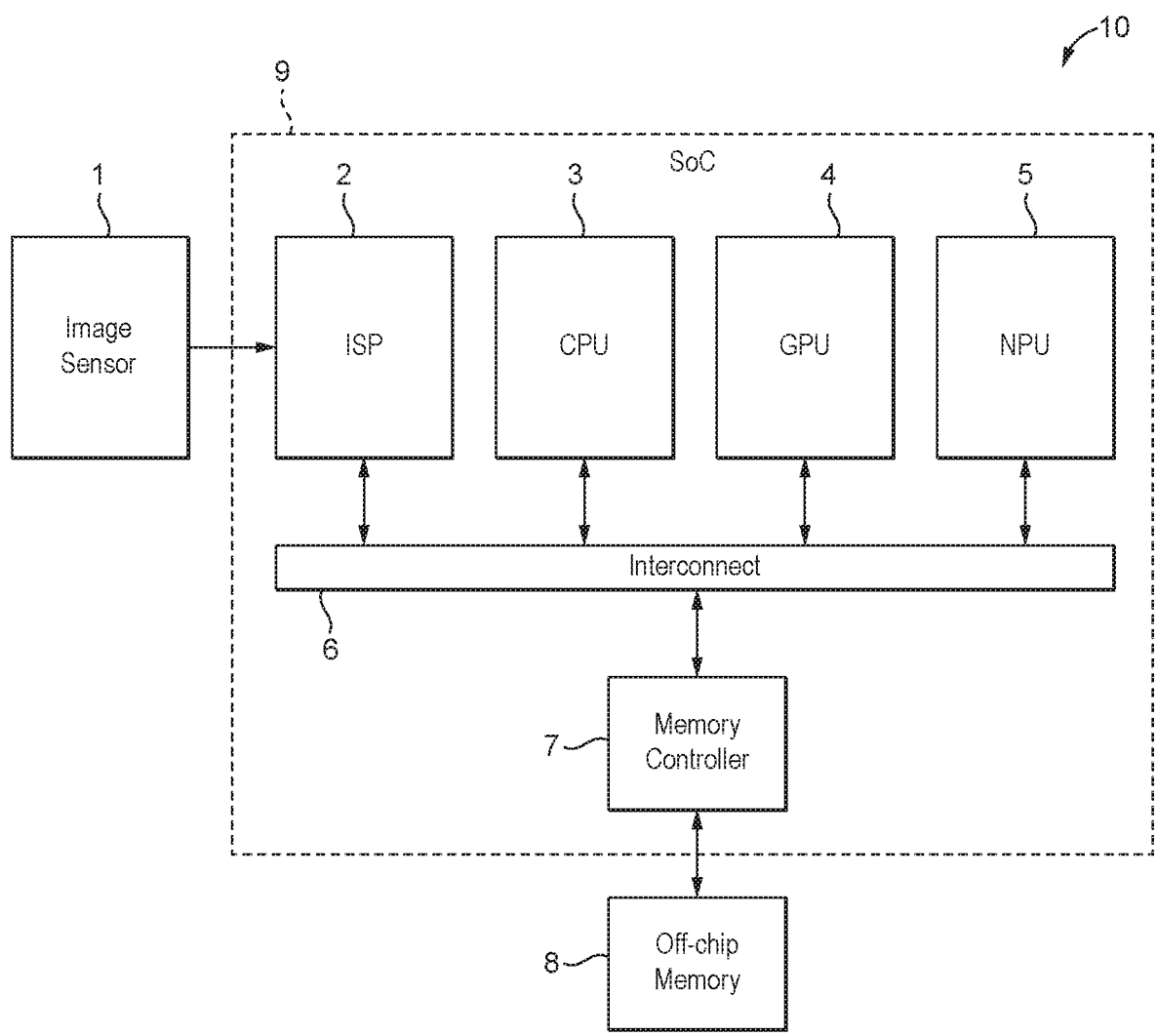
FIG. 1 shows schematically a data processing system operable to perform neural network processing.

A first embodiment of the technology described herein comprises a method of performing neural network processing in a data processing system, the data processing system comprising a processor operable to execute a neural network, and a memory for storing data relating to the neural network processing being performed by the processor;

the method comprising:

for neural network processing that uses weight values to be performed by the processor:

determining the order in which the neural network processing is to be performed by the processor;

determining the order in which the processor will use weight values to be used for the neural network processing based on the determined order of the neural network processing;

providing a sequence of commands that when executed will cause the processor to perform the neural network processing in the determined order;

providing the weight values to be used by the processor when performing the neural network processing in the determined order for the weight values;

and when the processor is to perform the neural network processing:

the processor:

executing the commands to perform the neural network processing in the determined order; and the processor, when performing the neural network processing in response to the commands, using the weight values in the determined order.

A second embodiment of the technology described herein comprises a data processing system operable to perform neural network processing, the data processing system comprising:

a processor operable to execute a neural network; and a memory for storing data relating to the neural network processing being performed by the processor;

the data processing system further comprising a processing circuit configured to:

for neural network processing that uses weight values to be performed by the processor:

determine the order in which the neural network processing is to be performed by the processor;

determine the order in which the processor will use weight values to be used for the neural network processing based on the determined order of the neural network processing;

provide a sequence of commands that when executed will cause the processor to perform the neural network processing in the determined order; and provide the weight values to be used by the processor when performing the neural network processing in the determined order for the weight values;

and wherein:

the processor is configured to:

execute the commands to perform the neural network processing in the determined order; and when performing the neural network processing in response to the commands, use the weight values in the determined order that they are provided in.

The technology described herein relates to the performance of neural network processing that, in particular, uses weight values. In the technology described herein, when a neural network that uses weight values is to be executed, the order of use of the weight values is determined based on the determined order of the neural network processing, and then the weight values are provided to the processor that is to perform the neural network processing in that determined order, such that, when performing the neural network processing, the processor will receive and use the weight values in the determined order.

The effect of this then is that the weight values will be provided to the processor in the order that they are to be used (and in the order that they are used). This can then reduce the number of memory transactions that are needed for fetching the weight values, thereby saving on memory bandwidth, power, etc., and in particular can reduce or avoid the need to randomly access weight values in a large array of weight values.

The Applicants have recognised in particular in this regard that it is possible for the compiler for a neural network processor to determine in advance the order of the neural network processing and to organise the weight values for use by the neural network processor based on the so-determined order that they are to be used in, such that the weight values can then be provided to the processor that is to perform the neural network processing in the order that they are to be used in, thereby facilitating the use of the weight values with reduced memory transactions, etc.

As will be discussed further below, the operation in the manner of the technology described herein can be particularly beneficial in the case where the weight values are compressed before providing them to the processor that is to perform the neural network processing, but in general the ordering of the weight values and providing of the weight values in the particular order in the manner of the technology described herein will be advantageous and useful, irrespective of whether the weight values are compressed or not.

The data processing system of the technology described herein may be any suitable data processing system that can execute a neural network and may comprise any suitable and desired components and elements that a data processing system can comprise, such as one or more or all of: a display processing unit, a central processing unit (CPU), a graphics processing unit (GPU) (graphics processor), a video processor, a signal processor, a display and a memory.

Correspondingly, the processor that executes the neural network may comprise any suitable processor that is capable of doing that, such as a central processing unit (CPU), a graphics processing unit (GPU) (graphics processor), a video processor, a sound processor, an image signal processor (ISP), a digital signal processor, and a Neural Network Accelerator/Processor (Neural Processor Unit) (NPU).

In an embodiment, the processor that executes the neural network comprises a plurality of processing (execution) engines (circuits) each operable to perform neural network processing operations in parallel with each other. For example, the processor may be configurable to have and operate as plural neural network processing engines (circuits) in parallel, such as having two, four, eight or sixteen neural network processing engines (circuits) that can operate in parallel to perform neural network processing operations when the processor is executing a neural network.

The data processing system is in an embodiment implemented on (as part of) an electronic device. Thus the technology described herein also extends to an electronic device that includes the data processing system of the technology described herein (and on which the data processing system operates in the manner of the technology described herein). The electronic device is in an embodiment a portable and/or lower powered device, such as a mobile phone or tablet.

The memory in which the data relating to the neural network processing is stored may comprise any suitable memory of the data processing system, such as a main memory of the data processing system.

In an embodiment, the data processing system also includes further storage (memory) that is "local" to the processor that executes the neural network, in which data can be stored for use by the processor when executing a neural network. Hence, the data processing system may comprise both local (e.g. on-chip) and main (e.g. external) memory.

The technology described herein may be used in conjunction with any suitable and desired neural network. In embodiments, the neural network is a convolutional neural network.

The neural network in an embodiment comprises one or more, and in an embodiment a plurality of layers, which operate in turn, e.g. such that the output data for one layer becomes the input data for a next layer. The layers of the neural network may, and in an embodiment do, comprise one or more convolution layers, pooling layers and/or fully connected layers.

The neural network can be being used for any form of neural network processing, such as to generate a (useful) output as may be output during inferencing by the neural network, but also during training of the neural network, or any other operation of a neural network that uses weights.

Correspondingly, the neural network may be processing any suitable and desired (initial) input data array that can be processed by a neural network to produce a useful output. For instance the input data array may comprise: an image, an image from an Image Signal Processor (ISP), an image frame from video data, sound data or voice data, or other input data. Correspondingly the neural network may be operable to identify or classify features present within the input data array, e.g. such as objects in an input image, or sound features in input sound data.

The technology described herein relates to the situation where neural network processing to be performed includes operations that use weight values. The technology described herein can be used whenever weight values are to be used in neural network processing and irrespective of the form or type or number of weight values that are to be used.

The weight values to be used for the neural network processing can relate to weight values for any form of neural network processing that uses weight values, such as for operations for fully connected layers of the neural network and/or for operations for convolution layers of the neural network. Correspondingly, while there may only be a single set of weight values that is needed for the neural network processing, in an embodiment there are plural sets of weight values for the neural network processing, e.g. comprising a respective set of weight values for respective different layers of the neural network that is to be executed. Thus, in an embodiment, the weight values that are used and ordered in the technology described herein comprise plural sets of weight values, with each set, e.g., and in an embodiment, being for a particular layer of the neural network that is to be executed.

Correspondingly, a (and each) set of weight values that is to be used can comprise and be in the form of any suitable and desired set of weight values, such as being in the form of an appropriate weight matrix, and/or a kernel of weight values (e.g. for use in a convolution operation (a convolution layer)). Other forms and sets of weight values could also be required and used, and the technology described herein is generally applicable irrespective of the particular form and configuration of the weight values that are to be used when executing the neural network.

The determining of the order in which the neural network processing is to be performed by the processor can relate to, and determine, any one or more or all of the aspects of the order that the neural network processing will be performed in. Thus it in an embodiment comprises determining (setting) at least one of, and in an embodiment all of: the order in which the processor will process layers of the neural network; and the order in which the processor will process a given layer of the neural network that is being executed (for example, and in an embodiment, in terms of the traversal order of the input feature map for the neural network layer in question). The order in which the processor will process a given layer of the neural network is in an embodiment determined for plural, and in an embodiment for each, layer of the neural network that is being executed.

In the case where the processor that is executing the neural network includes more than one execution engine (circuit) for neural network processing, then the determining of the order in which the neural network processing is to be performed in an embodiment also comprises determining the distribution of the processing to the different execution engines (circuits) of the processor, and correspondingly, the order in which each execution engine will perform its respective processing.

Once the order of performing the neural network processing has been determined, a set of commands for causing the processor to perform the neural network processing in the determined order is prepared and provided to the processor. This is in an embodiment done by storing in memory accessible to the processor, a set (sequence) of commands to trigger the processor to perform the neural network processing, which set of commands the processor can then read and execute in sequence so as to perform the desired neural network processing in the determined order. This operation can be performed in any suitable and desired manner, e.g., and in an embodiment, in accordance with the normal mechanism for triggering and controlling processing to be performed by the processor in the data processing system in question.

The order in which the weights (the weight values) for the neural network processing will be used is correspondingly determined in accordance with, and based on, the determined order for the neural network processing.

The ordering of the weight values can be based on any suitable and desired aspect of the order of the neural network processing. Thus, and correspondingly, it is in an embodiment based on one or more of, and in an embodiment both of: the determined order of processing the respective layers in the neural network when performing the neural network processing; and the determined processing (traversal) order within any given particular layer (and, in an embodiment, within each layer, where appropriate), of the neural network.

In an embodiment, the ordering of the weight values is done for (and with respect to) individual layers. Thus the weight ordering is in an embodiment done for weights in a single layer. Correspondingly, in an embodiment even if layer execution is interleaved, the weights aren't interleaved between layers. Thus in an embodiment the weight order within a stream of weights for a given layer is the same, regardless of any layer interleaving.

In an embodiment, the ordering of the weight values includes interleaving weight values from (multiple) different sets of weight values (kernels) based on the order in which the weight values will be used when performing the neural network processing. The weight values are in an embodiment ordered at a fine granularity. For example, weight (0,0) for 16 input channels might be stored together, followed by weight (1,0) for the same 16 kernels, and so on.

Again, the ordering of the weight values in an embodiment also takes account of the number of execution engines (circuits) that will perform neural network processing on the processor, and the determined distribution of the neural network processing work to those execution engines (circuits). Thus, in the case where there are plural execution engines (circuits), the weights are in an embodiment subdivided into separate streams (sets), one per execution engine (and correspondingly stored in different parts of memory).

For example, and in an embodiment, in the case of a convolution operation, the weights to be used for the convolution operation may be, and are in an embodiment, divided into respective sets of weight values per execution engine, and then, within each set, the respective filter kernels (sets of weight values) are ordered to match the order of input and output feature map processing. For example, if a first execution engine computes output maps 0-15 and a second execution engine does maps 16-31, the weights for maps 0-15 are in an embodiment arranged as one stream (set) of weight values and the weights for maps 16-31 as another stream (set), with each execution engine reading its stream of weight values independently. Within a given stream, the weights will be stored in an order matching the order that the execution engine will need the weight values.

The (sets of) weights to be used for the neural network processing should be, and are in an embodiment, provided by the, e.g. application, e.g. executing on a host processor (CPU) of the system, that requires the neural network processing in question, e.g. by storing the weight values in memory, and the operation in the manner of the technology described herein will accordingly (in an embodiment) comprise re-ordering the weight values that are provided by the application into a new, desired order, based on the determined order of performing the neural network processing.

Thus, in an embodiment of the technology described herein, the method comprises (and the processing circuit is correspondingly configured to) re-ordering an initially provided sequence of weight values to a new order of the weight values based on the determined order of performing the neural network processing (and then providing the re-ordered weight values to the processor for use). Thus, in an embodiment, the weight values are initially provided in a first order, and the technology described herein operates to re-order the weight values into a second, different order of the weight values, based on the determined order of performing the neural network processing. Such re-ordering may comprise, e.g., and in an embodiment, re-ordering the weight values within a given set or sets of weight values (relative to each other within the set in question), and/or re-ordering one or more sets of weight values relative to another set or sets of weight values (i.e. changing the order (sequence) of the sets of weight values). It may also, and in an embodiment, comprise interleaving weight values from different sets of weight values.

The weight values can be (re-)ordered exactly in the order that they will be used by the processor when performing the neural network processing (and in one embodiment this is what is done).

However, the Applicants have recognised that a strict adherence to the exact order in which the weight values will be used for the neural network processing may not always be necessary, for example in the case where the processor can itself perform some (e.g. limited) "re-ordering" of the weight values before it uses them. This may in particular be the case, and be possible, where, for example, the processor comprises some form of local storage in which weight values can be stored in use, and from which the processor can read the weight values when performing the neural network processing, as that will, in effect, facilitate some re-ordering of the weight values as they are read from the local storage.

Thus, in an embodiment, the processor includes local storage in which the weight values can be stored for use, and from which weight values can be read so as to permit re-ordering of the weight values stored in the local storage. In this case, the local storage should be, and is in an embodiment, configured and operable to store a limited, relatively small, number of weight values, and typically will not and should not be able to store the entire set of weight values that may be required at any one time.

Thus, in an embodiment, the (re-)ordering of the weight values comprises ordering respective groups of the weight values (with each group comprising at least one and in an embodiment a plurality of weight values (but not all of the weight values that are to be used for the neural network processing) in an order (sequence) relative to each other based on and corresponding to the order in which the respective groups of weight values will be used when performing the neural network processing, but with the weight values within each group not necessarily being ordered exactly in the order (sequence) relative to each other that they will be used in (although that would be possible and in embodiments is done, at least where it is possible to do that).

Thus, in an embodiment, respective groups of weight values are ordered with respect to each other in a sequence that corresponds to the order in which the groups of weight values will be used in the determined order of performing the neural network processing, but within the individual groups, the weight values may simply be ordered in the order that they are provided (e.g. by the application that requires the neural network processing).

It would also be possible to order the weight values within given groups of weight values, but then to be able to access the respective groups of weight values in different orders (and e.g. not in the order that the groups are ordered in relative to each other) (and in one embodiment, that is what is done). This could be useful where the weights could be used by two or more different processors that have a different traversal order at a higher (coarser) level. In this case, each processor could read the respective groups of weights in a different order (but use the weights within a given group in the same order). Metadata may, for example, be provided to allow the processors to identify and fetch the different groups of weights.

Other arrangements would, of course, be possible.

Such ordering of groups of weight values may be performed within respective, individual, sets of weight values to be used (such that, e.g., and in an embodiment, a given set of weight values (e.g. to be used for a given neural network layer) will be divided into a plurality of groups of weight values that are then ordered relative to each other), as well as across the entire collection of weight values that are to be used for the neural network processing.

In an embodiment, the subdivision of the weight values into respective smaller groups of weight values (which groups are then, e.g. ordered in sequence) is done on the basis of the data size(s) of the groups of weight values (in their uncompressed form) (and thus based on the number of weight values in each group (e.g. such that each group contains the same number of weight values)).

In an embodiment the weight values are subdivided into respective, separate groups of data values such that each group has (substantially) the same particular, in an embodiment selected, in an embodiment predetermined, data size in their uncompressed form, and, e.g., and in an embodiment, based on the capacity (size) of any (local) storage that's used for the decompressed weight values. Thus, in the case where, as will be discussed further below, the weight values are compressed before providing them to the processor, in an embodiment the weight values will be divided into groups such that each group of weight values in its uncompressed form has (substantially) the same particular, in an embodiment selected, in an embodiment predetermined, data size.

In an embodiment, the weight values are packed (in their form as provided to the processor that is performing the neural network processing) into respective data packets having a particular, selected, in an embodiment determined, and in an embodiment fixed, data size. Thus the weight values will be divided into, in an embodiment fixed, and in an embodiment the same, size data packets for providing to the processor that is performing the neural network processing.

In these arrangements, the weight values are in an embodiment organised into data packets such that each data packet contains an integer number of weight values (i.e. without any weight value having to occupy (span) more than one data packet). Thus, data packets can be padded with dummy values if necessary in the case where the weight data for a given collection of weight values does not fill a packet completely.

(It should be noted in this regard, that where compressed data values are organised into packets on the basis of their (compressed) data size in this manner, then in the case of variable rate compression at least, it could be the case that given data packets will contain different numbers of weight values.)

In these embodiments, the data packets that the weight values are stored in in an embodiment have a data size corresponding to an appropriate amount of data that may, e.g., and in an embodiment, be handled as an individual data "unit" in the data processing system, e.g., and in an embodiment, in terms of memory transactions within the data processing system, and/or that may be storable in its entirety in the local storage of the processor (if any).

Thus in an embodiment, each data packet that stores weight values has a data size that corresponds to the amount of data that can be fetched in a single memory transaction (a memory "burst" size), and/or to the size of a respective cache line or a particular, in an embodiment selected, in an embodiment predetermined, (plural) number of cache lines.

This will then facilitate, for example, allowing respective packets of weight values to be fetched and handled as a single memory transaction (with the weight values within a given individual packet or packets in an embodiment then being able to be re-ordered relative to each other by the processor that is performing the neural network processing in use, and then used in their entirety before weight values from another packet or packets are fetched in a different memory transaction).

The ordered weight values for use for the neural network processing can be provided to the processor for use when performing the neural network processing in any suitable and desired manner. This is in an embodiment done by storing the weight values in memory from where the processor can read the weight values for use. In an embodiment the ordered weight values are stored as an ordered sequence of weight values in memory from where the processor can then read those weight values in sequence, so as to receive and use the weight values in the desired order.

In an embodiment, the ordered weight values are stored together (contiguously) in the memory (i.e. at contiguous and progressively increasing memory addresses). Thus, the ordered weight values for use for the neural network processing are in an embodiment packed together as a contiguous sequence of addresses in the memory, from where they can then be read by the processor for use.

In the case where, as discussed above, the weight values are organised as respective groups of weight values each occupying a given data packet, then each data packet will comprise a contiguous block of memory addresses, and the respective data packets are in an embodiment stored contiguously with each other, i.e. such that one data packet immediately follows the previous data packet in the memory address order.

This will then facilitate reading the required weight values in appropriate bursts (and as appropriate blocks) efficiently from the memory, as the processor can, for example, and in an embodiment, simply read successive data packets (bursts) from the memory at progressively increasing addresses until the end of the sequence of weight values has been reached.

In order to facilitate this operation, the processor that is performing the neural network processing may be, and is in an embodiment, provided with a pointer to the location of the weight data in memory, and the length of that data, such that the processor can then read the weight data from memory as an increasing sequence of memory addresses up until the indicated length of the weight data.

Other arrangements would, of course, be possible.

Thus, in an embodiment, the weights are stored in memory in the order that they are to be used when the processor performs the neural network processing, e.g. and in an embodiment as a sequence (stream) of weights such that the weights are stored as a continuous stream of weights at progressively increasing addresses, with the processor then correspondingly reading the weight data from the memory at progressively increasing addresses (until the end of the stream of weights is reached), so as to receive and correspondingly use the weights in the selected and desired order.

In an embodiment, as discussed above, as part of this processing, the processor will read successive packets (bursts) of weight data from the memory, use the weight values in the packet ("burst"), and then read a next burst for the next weight values in the sequence order, and so on, until the end of the set (stream) of weight values is reached. In an embodiment, as part of this processing, the processor will store the weight values that are read from the memory in local storage of and accessible to the processor for use when performing the neural network processing (and then replace those locally stored weight values with a next group of weight values fetched from the memory, and so on).

The ordering of the neural network processing, and the corresponding ordering of the weights to be used for that processing, and the provision of the commands and weights for the processor that is to perform the neural network processing, can be performed by any suitable and desired element and component of the overall data processing system.

In an embodiment, this is done by a processor of the data processing system, such as, and in an embodiment a CPU (e.g. a host processor) of the data processing system.

In an embodiment, this is done by a compiler for the processor that is to perform the neural network processing, which compiler is, e.g., and in an embodiment, executed on a CPU of the data processing system.

Thus, in an embodiment, the processing circuit that performs these operations comprises a processor, e.g. of the data processing system, and in an embodiment a compiler circuit of that processor, which compiler circuit in an embodiment comprises a programmable processing circuit that is appropriately programmed to perform the required compiler operation.

The determining of the order of the neural network processing and the corresponding ordering of the weight values to be used for that processing, etc., could be performed by a compiler that executes (and that is executing) as part of the driver operation for the processor that is to perform the neural network processing (and in one embodiment, that is the case).

In an embodiment, the determining of the order of the neural network processing and the corresponding ordering of the weight values to be used for that processing, etc., is performed (by an appropriate compiler) in advance of any execution of and performing of the neural network processing itself, in an "offline" manner. Thus the compilation process is in an embodiment done in advance of runtime, rather than at runtime for the neural network in question. Correspondingly, the compiler in an embodiment executes separately and in advance of running the driver (the driver operation for the processor that is to perform the neural network processing).

In this case therefore the compiler will run on a processor (e.g. CPU), but that may not necessarily be the same processor (CPU) on which the application that requires the neural network is executing, or the same processor (CPU) that is executing the network at runtime.

The compilation process is in an embodiment performed only once (for a given (trained) neural network, with the appropriately compiled neural network processing (commands and data) then being reused each time the neural network in question is to be executed.

Thus, the compiler can run offline or at run-time, but in an embodiment is only (and should only need to be) run once for a given (trained) neural network.

The technology described herein accordingly extends to compiler operation in the manner of the technology described herein per se, and correspondingly, to the operation of a processor performing neural network processing using such a compiled neural network.

Thus, another embodiment of the technology described herein comprises a method of compiling a neural network to be executed by a processor operable to execute a neural network;
  the method comprising:
  for a neural network that uses weight values to be executed by a processor:
    determining the order in which the neural network processing is to be performed by the processor;
    determining the order in which the processor will use weight values to be used for the neural network processing based on the determined order of the neural network processing;
    and
    providing a sequence of commands that when executed will cause the processor to perform the neural network processing in the determined order; and
    providing the weight values to be used by the processor when performing the neural network processing in the determined order for the weight values.

Another embodiment of the technology described herein comprises a compiler for compiling a neural network to be executed by a processor operable to execute a neural network:
  the compiler comprising a processing circuit configured to:
  for a neural network that uses weight values to be executed by a processor:
    determine the order in which the neural network processing is to be performed by the processor;
    determine the order in which the processor will use weight values to be used for the neural network processing based on the determined order of the neural network processing;
    and
    provide a sequence of commands that when executed will cause the processor to perform the neural network processing in the determined order; and
    provide the weight values to be used by the processor when performing the neural network processing in the determined order for the weight values.

Another embodiment of the technology described herein comprises a method of operating a processor operable to execute a neural network;
  the method comprising:
  the processor, when performing neural network processing that uses weight values:
    executing a sequence of commands that cause the processor to perform the neural network processing in a determined order; and
    when performing the neural network processing in response to the commands, using, in the determined order, a sequence of weight values that have been provided in the determined order.

Another embodiment of the technology described herein comprises a processor operable to execute a neural network, the processor comprising:
  a processing circuit configured to execute a sequence of commands to cause the processor to perform neural network processing in a determined order; and
  a processing circuit configured to, when performing neural network processing in response to the commands, use, in the determined order, a sequence of weight values that have been provided in the determined order.

As will be appreciated by those skilled in the art, these embodiments of the technology described herein can and in an embodiment do include any one or more or all of the features of the technology described herein described herein. Thus, for example, the compiler in an embodiment stores the sequence of commands and the weight values in memory in the determined order, from where they can then be fetched by the processor in use. Correspondingly, the processor in an embodiment obtains the commands for execution and the weight values from memory (in the determined order).

The weight values may be provided to the processor that is to perform the neural network processing (and, e.g., stored in the memory) in an uncompressed form. However, in an embodiment, the weight values are compressed before they are provided to the processor, with the processor then operating to decompress the weight values before then using them for the neural network processing. In this case, the weight values are in an embodiment re-ordered into the desired order, and then compressed, with the compressed representation of the weights then being packed so as to provide a continuous stream of compressed weights, e.g. in the memory (at a contiguous sequence of memory address), which the processor that is performing the neural network processing can then read (and decompress) in use.

In this arrangement, any suitable and desired compression process (scheme) can be used for compressing the weight values. In an embodiment, a variable rate, and in an embodiment a lossless, compression scheme is used, which will generate a variable number of bits per weight value in the compressed representation of the weights. In this case therefore, as discussed above, a read from the memory of a particular data packet (unit (burst)) of a fixed size of compressed data will then decompress into a variable number of weight values, which can then be used by the processor for performing the neural network processing.

The compression scheme is in an embodiment such that respective groups of compressed weights can be independently decoded (without requiring data relating to other groups of weights to allow that decoding to take place). Thus in an embodiment the compression scheme is such that for a given "unit" (packet) of compressed data (such as a "burst" of compressed data), that set of compressed data can be decoded (decompressed) on its own, and independently of, any data that may be in other sets of compressed data.

Thus the processor will in an embodiment read appropriate packets (units) of compressed weight data ("bursts") from the memory, decompress those packets of weight data into a corresponding group of (decompressed) weight values, use the decompressed weight values for the neural network processing, and then when it has used that group of decompressed weight values, read and decompress a next group of compressed weight values and so on.

Thus, in an embodiment, the weight values are ordered into the desired sequence based on the determined order of the neural network processing, and the so-ordered weight values are then compressed, in an embodiment as a fully packed stream, so that, as the processor that is performing the neural network processing fetches and decompresses the weight stream, the next group of weights that is fetched and decompressed is the group of weights that are needed next for the neural network processing.

It is believed that the technology described herein is particularly advantageous in the case where it is desired to compress the weight values using a variable rate compression scheme (i.e. in which respective weight values could compress to different numbers of bits per weight), since it will avoid the need to random access values within a variably compressed weight stream (which would make reading the compressed weight data more complicated, less efficient and, e.g., require metadata to find the needed weights). In particular, in the technology described herein, in its embodiments at least, when using a variably compressed weight stream, the processor that is performing the neural network processing can simply read and decode successive groups of weights and use those groups of weights in turn, without the need to access and use other groups of weights before a given group of weights has been completely finished with.

Furthermore, (re-)ordering the weights to match the processing order, can facilitate more optimal lossless compression where the number of bits per weight varies and it is impractical to random access into the compressed weights. Compressing the weights reduces the storage footprint externally and internally and the memory traffic to load compressed weights from external storage.

Equally, any lossless compression scheme will be variable rate, and having the weights reordered and fully packed together makes such schemes simpler and more efficient (as weights compress better with full packing).

Thus, in an embodiment, the providing of the weight values (in the determined order) to the processor comprises (and the processing circuit is correspondingly configured to) compressing the ordered weight values, in an embodiment using a variable rate, and in an embodiment a lossless, compression scheme, before providing the weight values to the processor for use. Correspondingly, the processor in an embodiment operates to, and comprises a decoder (decoding circuit) that is configured to, decompress the compressed weight values before the weight values are used for the neural network processing. This decompression operation is in an embodiment performed in conjunction with local storage for the processor, such that the compressed weight values will be decompressed and stored in the local storage, from where they will then be retrieved and used by the processor when performing the neural network processing.

Other arrangements would, of course, be possible.

Once the sequence of commands, and the ordered weight values, for the neural network processing have been prepared, the processor can perform the neural network processing. To do this, it will, e.g., and in an embodiment, read and execute the commands in sequence, and, correspondingly, read and use the weight values in their ordered sequence. Thus when performing the neural network processing, the processor will accordingly execute the commands provided to it to perform the neural network processing, and as part of that processing will use the provided weight values in the order that they are provided to perform the necessary neural network processing operations.

In an embodiment the processor that is performing the neural network processing reads the weight values from the memory where they are stored at progressively increasing addresses until the end of the stream of weight values is reached.

The weights are then used in sequence to evaluate whatever layer type, kernel size, etc. is being evaluated by the processor.

Thus, once a group(s) of weight values has been fetched (and if necessary decompressed), the neural network processing operation using the weight values can be, and is in an embodiment, performed. The neural network processor, as discussed above, in an embodiment fetches (and if necessary decompresses), and then uses, successive groups of weight values in turn. Thus the neural network processor will fetch a group of weight values and use that group of weight values (in its entirety), before then fetching and using a next group of weight values in the weight value order (again in its entirety), before then using the next group of weight values, and so on.

As discussed above, in an embodiment, the operation of the processor using the weight values may, and in an embodiment does, comprise performing some reordering of the weight values by the processor before they are used, for example, and in an embodiment, within a given group of weight values (data packet of weight values) that has been fetched (and if necessary decompressed). In an embodiment, such reordering by the processor is done by the processor storing received (and if necessary decompressed) weight values in the order that they are received in local storage of the processor, but then reading the weight values for use from the local storage (and using the weight values from the local storage) in a different order of weights to the order that they are stored in in the local storage).

Thus, in an embodiment, the processor is operable to and operates to fetch (a data packet (burst) containing) a group of weight values from the memory, then if necessary, and in an embodiment, decompress that group of weight values, and store the group of weight values in local storage of the processor, and then read the weight values for use from the local storage (and use the weight values from the local storage), e.g. in a different order of weights to the order that they are stored in in the local storage; and then fetch a new (and next) group of weights (data packet) from the memory and store that group of weights in the local storage, in an embodiment in place of an existing group of weights in the local storage, read the weight values for the new group of weights for use from the local storage, e.g. in a different order of weights to the order that they are stored in in the local storage, and so on.

Other arrangements would, of course, be possible.

Subject to the operation in the manner of the technology described herein, the neural network processing operation(s) can be performed in any suitable and desired manner, such as, and in an embodiment, in accordance with the normal operation for performing such operations in the neural network and for the processor executing the neural network, in question. Thus, e.g., input data array (input feature map) values for, e.g., the appropriate data positions may be multiplied by the weight values for the data positions in question to provide the appropriate output(s) for the data positions in question (and so on for successive layers in the neural network).

Other arrangements would, of course, be possible.

The output of the neural network processing can be used as desired, for example to provide an output to a user, and/or as a result for the application that required the neural network processing to act upon (and in accordance with). The output may, e.g., be written out to storage, e.g. main memory, for this purpose.

The data processing system may comprise and/or be in communication with one or more memories (such as the memories described above) that store the data described herein, and/or store software for performing the processes described herein. As discussed above, the data processing system in an embodiment comprises a host microprocessor (CPU), e.g. that can execute applications that require neural network processing.

As well as the particular processors, etc., necessary for the operation in the manner of the technology described herein, the data processing system can otherwise comprise any suitable and desired element or component that a data processing system may comprise, such as, and in an embodiment, one or more or all of: a graphics processor, a video processor, an image signal processor, a display processor and a display (e.g., and in an embodiment, that can be used for displaying output data associated with the neural network processing).

The data processing system of the technology described herein may be implemented as part of any suitable system, such as a suitably configured micro-processor based system. In some embodiments, the technology described herein is implemented in a computer and/or micro-processor based system. The data processing system may be a microprocessor, a programmable FPGA (Field Programmable Gate Array), etc.

The various functions of the technology described herein may be carried out in any desired and suitable manner. For example, the functions of the technology described herein may be implemented in hardware or software, as desired. Thus, for example, the various functional elements and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

It will also be appreciated by those skilled in the art that all of the described embodiments of the technology described herein may include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program comprising computer software code for performing the methods herein described when the program is run on a data processor, and a computer program comprising code adapted to perform all the steps of a method or of the methods herein described when the program is run on a data processing system.

The technology described herein also extends to a computer software carrier comprising such software which when used to operate a data processing system causes in a processor, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described.

FIG. 1 shows a data processing system 10 which may be used to perform neural network processing. The data processing system comprises an image sensor 1 which may be operable to provide image data to an image signal processor 2. The image signal processor 2 may process the image data to provide data that is suitable for use as input data for neural network processing. The data processing system also comprises a central processing unit (CPU) 3, a graphics processor (graphics processing unit) (GPU) 4, and a neural network processor (processing unit) (NPU) 5.

The CPU 3 acts as a host processor and is operable to control the components of the data processing system 10, for example by issuing appropriate commands. The GPU 4 is operable to perform graphics processing. The NPU 5 is a processor that is specifically configured or optimised to perform neural network processing, such as performing identification or classification of objects within images that are provided by the image sensor 1, ISP 2 or GPU 5.

The data processing system 10 comprises an interconnect 6 which provides an interface between the various processors (ISP, CPU, GPU and NPU) and with an off-chip memory 8, via a memory controller 7. The memory controller 7 is operable to manage memory read and write requests, and to control reading and writing of data to off-chip memory 8.

The ISP 2, CPU 3, GPU 4, NPU 5, interconnect 6 and memory controller 7, may be provided as part of a system-on-chip 9. The image sensor 1 may be located off-chip. The off-chip memory 8 may comprise a main memory which is external to the system-on-chip.

Although the NPU 5 may be specifically configured for performing neural network processing, other processors of the data processing system (such as the ISP, CPU and GPU) could also be used to perform neural network processing, if desired.

Although an image sensor 1 is shown in FIG. 1 for providing input data in the form of image data, other sensors or input devices could be incorporated within the data processing system, such as for example, a microphone to provide sound data.

Figure 2:
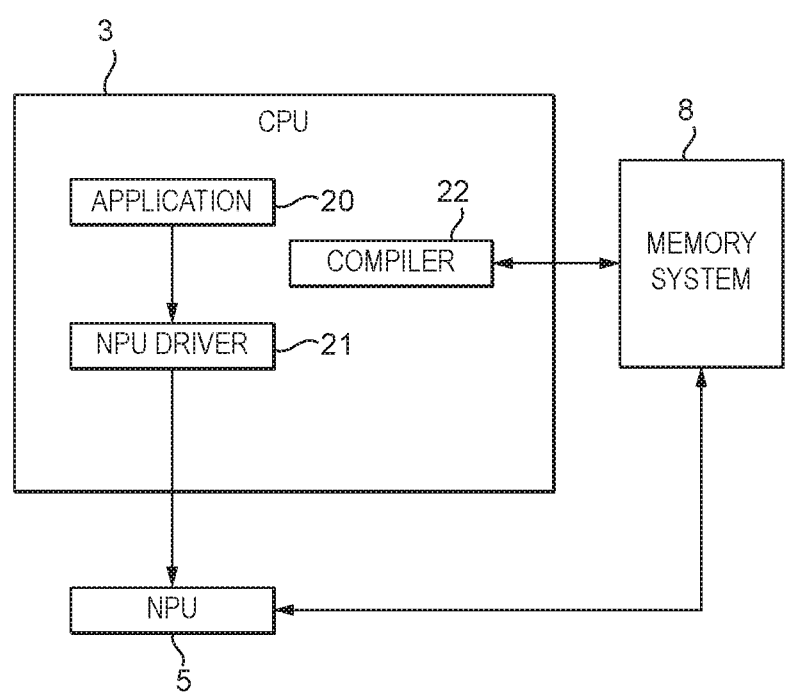
FIG. 2 shows in more detail the control of neural network processing in a data processing system such as that shown in FIG. 1.

FIG. 2 shows schematically and in more detail the components of the data processing system 10 which may be used for determining and controlling the execution of neural network processing by the NPU 5 in FIG. 1.

As shown in FIG. 2, an application 20 executing on the CPU 3 of the data processing system 10 may require neural network processing to be performed. The application 20 is operable to interact with a driver 21 (which may, e.g., be a software layer which executes on the CPU 3) for the neural network processor 5. The application may send a request to the driver 21 requesting that neural network processing is to be performed. Sending the request may include sending instructions for performing the neural network processing to the driver 21.

The driver 21 is operable to, in response to receiving a request for performing neural network processing, cause and control the NPU 5 to perform that processing. This will be discussed in more detail below.

(Although FIG. 2 shows an application 20 executing on the CPU 3 being operable to send neural network processing requests to the driver 21, other processing elements (e.g. such as other processors of the data processing system, or other processors of an electronic device incorporating the data processing system) may also be operable to send neural network processing requests to the driver 21.)

FIG. 2 also shows a compiler 22 that can execute on the CPU 3 to prepare commands and data for causing the neural network processor NPU 5 to perform desired neural network processing (and to store those commands and data appropriately in the memory system 8 for retrieval by the NPU 5). The compiler operation will be discussed in more detail below.

It would also be possible for the compiler to execute on a different processor (e.g. for a given neural network to be pre-compiled elsewhere, if desired).

Figure 3:
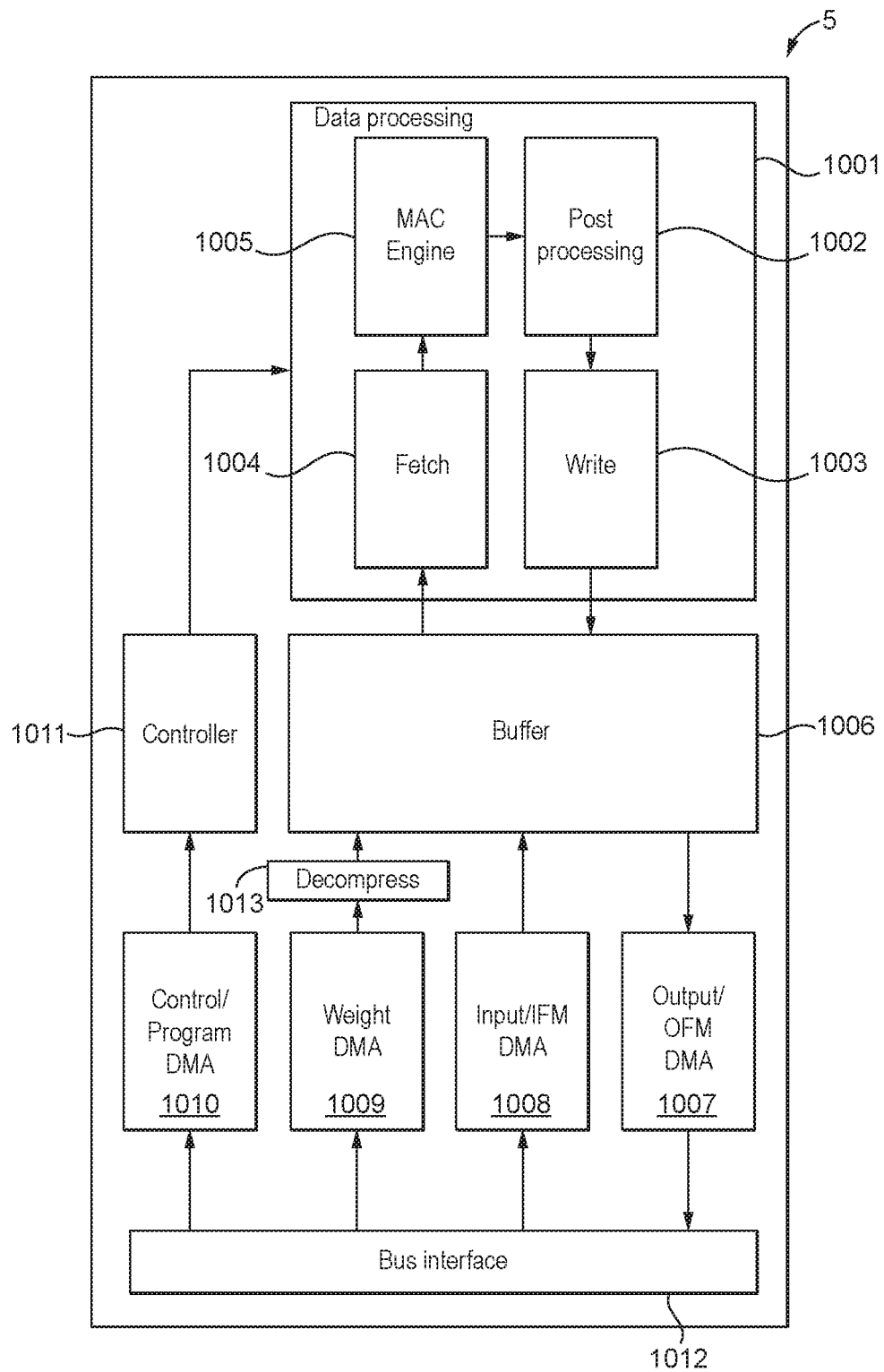
FIG. 3 shows the neural network processor of the present embodiments in more detail.

FIG. 3 is a schematic diagram showing elements of the neural network processor 5 of the present embodiments in more detail.

The neural network processor 5 comprises a number of on-chip components such as data processing circuits 1001 which perform the neural network processing. The data processing circuits 1001 comprise a fetch circuit 1004 for fetching data (e.g. corresponding to data of an input data array or a feature map, weights, etc.) from a buffer (local, on-chip memory) 1006. The data processing circuits 1001 also comprise a write circuit 1003 for writing data (e.g. corresponding to data of data arrays such as output feature maps) to the local storage (buffer) 1006. The data processing circuits 1001 also comprise a MAC (multiply accumulate) Engine (circuit) 1005 and a post-processing unit (circuit) 1002.

As will be discussed further below, the data that is required for (or generated by) the neural network processing (e.g. such as input feature maps, output feature maps, weights arrays, biases, and other program control data) is stored in the off-chip memory 8, such that that data, commands, etc. that is stored in the off-chip memory 8 needs to be loaded into local (on-chip memory) 1006 of the neural network processor 5 before it can be used for the neural network processing. The processor 5 therefore comprises an output feature map (OFM) direct memory access (DMA) unit 1007, an input feature map (IFM) direct memory access (DMA) unit 1008, a weight array direct memory access (DMA) unit 1009, and a control/program direct memory access (DMA) unit 1010. The DMA units 1007-1010 are operably connected to the on-chip memory (buffer 1006) and to the main off-chip memory 8 via a bus interface 1012.

As shown in FIG. 3, and as will be discussed further below, the NPU 5 also includes a decoder (decompressor) circuit 1013 that is operable to decompressed compressed weight values fetched by the weight array direct memory access unit 1009, before the weight values are stored (in an uncompressed form) in the local storage (buffer) 1006.

The operation of the NPU 5 when performing the neural network processing is controlled by a controller 1011, which is operable to receive sequences of commands (programs) via the control/program DMA unit 1010 for execution. The controller 1011 will execute the commands that are received, by causing the data processing circuits 1001 to perform the necessary neural network processing operations in response to the commands (and using the necessary data to be processed, or for that processing, stored in the local storage (buffer) 1106).

Other arrangements for the NPU 5 would, of course, be possible.

Figure 4:
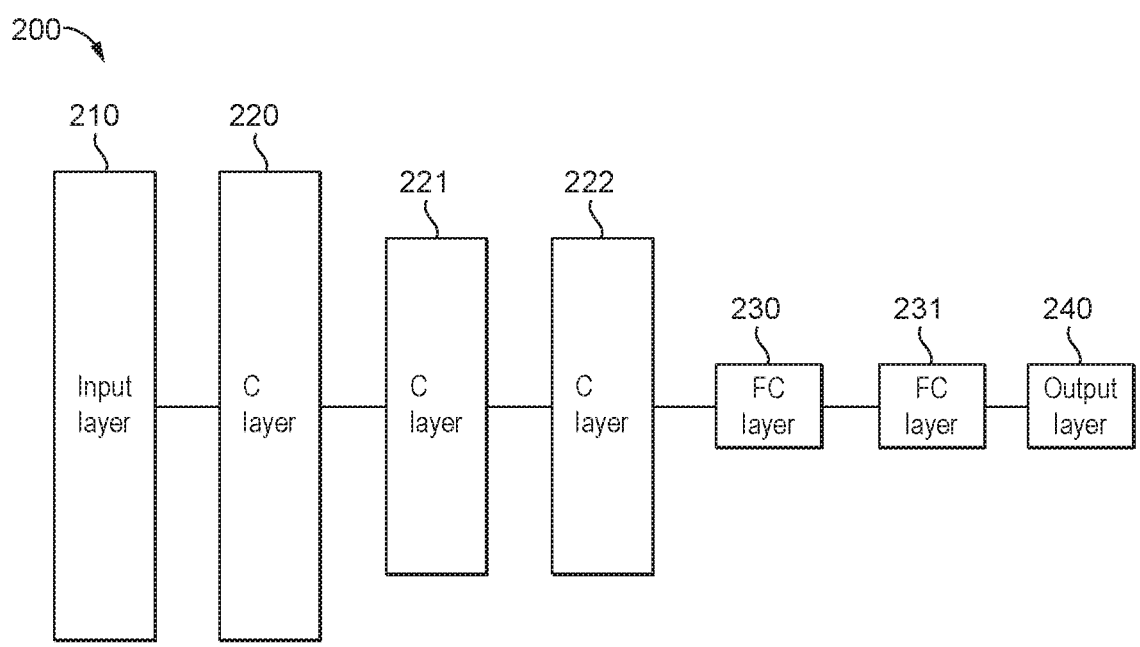

FIG. 4 shows schematically an exemplary neural network 200 that the technology described herein may be used for. FIG. 4 shows a convolutional neural network (CNN) (but the technology described herein can be used for any form of neural network that uses weight values). The CNN comprises a number of layers which operate one after the other, such that the output from one layer is used as the input for a next layer.

The CNN shown in FIG. 4 comprises an input layer 210. The input layer may be adapted to receive an input data array (e.g. comprising data corresponding to image or sound data). The input layer may comprise a number of processing nodes (or "kernels") which receive an input data array and pass that data array on to the next layer of the neural network.

The next layer shown in FIG. 4 is a convolution layer (C Layer) 220. The convolution layer may generate a feature map which comprises a representation of features that were present in the data array that was provided to the convolution layer.

A pooling layer may also be provided after the convolution layer (in FIG. 4 these are both incorporated into the convolution layer, although it is to be understood that they can comprise separate layers). The pooling (or "downsampling") layer may operate to reduce the size of a data array (e.g. feature map) that is input into the pooling layer. Hence, as shown in FIG. 4, successive convolution layers may be smaller since they are processing smaller data arrays. The pooling layer may produce (output) a data array (e.g. a further feature map) which is an "equivarient" representation of the data array that was input into the pooling layer (meaning that the representation is almost invariant to changes in the scale and position of features in the data array that was input into the pooling layer).

After one or more convolution layers 220, 221, 222 the neural network may comprise one or more fully connected (FC) layers 230, 231. The fully connected layers may operate on a data array (e.g. feature map) generated by the convolution and/or pooling layers. The one or more fully connected layers may operate one after the other such that the data that is output from one fully connected layer is used as the input data for a next fully connected layer. The final fully connected layer may produce a final output data array or output data set which may comprise a useful output (e.g. an identification or classification of an object in the image data that was originally received by the input layer of the CNN).

The final fully connected layer 231 passes the useful output to the output layer 240 of the neural network. The output layer 240 comprises a number of processing nodes which receive the useful output data and pass the useful output data on towards other components of the data processing system which are outside of the neural network (e.g. such as further processing and display components which can display the output data, for example).

Although FIG. 4 shows a certain number of convolution and FC layers, the neural network may comprise fewer or more such layers if desired (and may also or instead comprise other layers which operate in a different manner to the convolution and FC layers).

Figure 5:
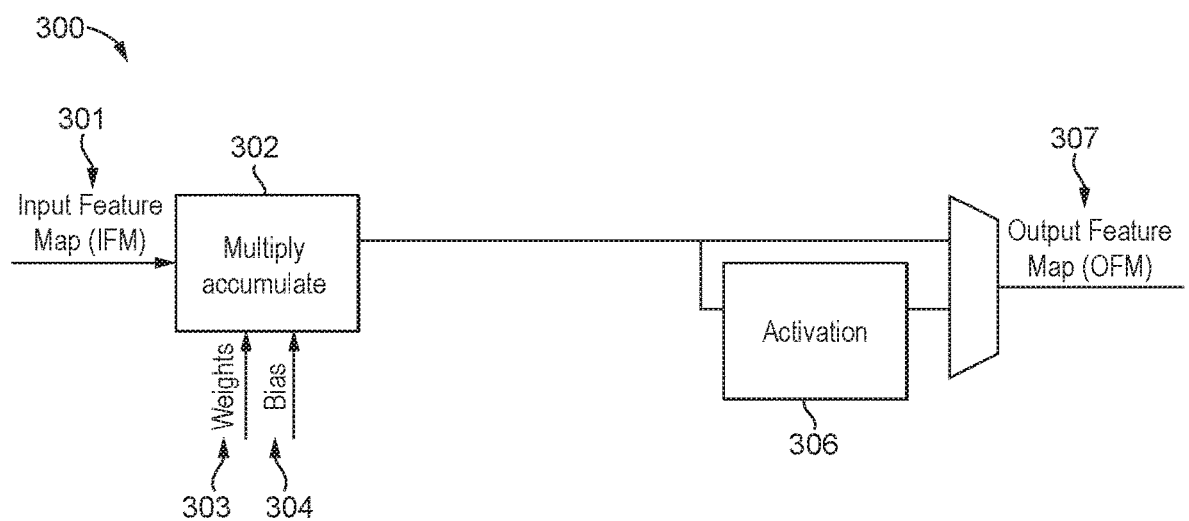
FIG. 5 shows schematically the operation of a convolution layer of a neural network.

FIG. 5 shows schematically the operation of a convolution layer 300 of a neural network. The convolution layer operates on a data array 301 which is shown to be an input feature map (IFM) (which may have been received from a previous convolution layer as discussed above).

The convolution layer performs an operation to modify the data array in order to produce (output) a modified data array (e.g. feature map).

In the case shown in FIG. 5, the convolution layer performs a multiply accumulate operation 302. The multiply accumulate operation 302 uses weights 303 (e.g. a weight array) and a bias 304. Generally speaking, the weights will have been selected to extract or identify certain features within the input data set, such as e.g. edges in an input image.

The multiply accumulate operation comprises performing a weighted sum of a selection of points from the data array (e.g. feature map). The selected points may be referred to as a "receptive field" or a "window". The weights for the weighted sum may also be referred to as a "filter" or "kernel". Each data point of the output feature map may be generated using a multiply accumulate operation as follows:

$$Y = w1 \cdot X1 + w2 \cdot X2 + w1 \cdot Xn + b$$

wherein Y is an output data point, where X1 to Xn are input data from input data points, where w1 to wn are associated weights, and where b is a bias that is added.

When the convolution layer is executing, the array of weights may be "slid" (or "convolved") over the input data array (e.g. image or input feature map) one data point at a time, so as to build up an array of data points for the output feature map.

A convolution layer may perform plural multiply accumulate operations, each using a different set of weights, to generate plural output feature maps which extract or identify different features. If a convolution layer receives plural input feature maps, each multiply accumulate operation may act (perform a weighed sum) across all of the input feature maps.

An activation operation 306 may or may not also be applied. The activation operation 306 may comprise applying a non-linear function (referred to as an "activation function") to the data points of the data array that is generated by the multiply accumulate 302 operation. The activation function may comprise a ReLU, sigmoid or tanh(x) function, or any other suitable function.

Figure 6:
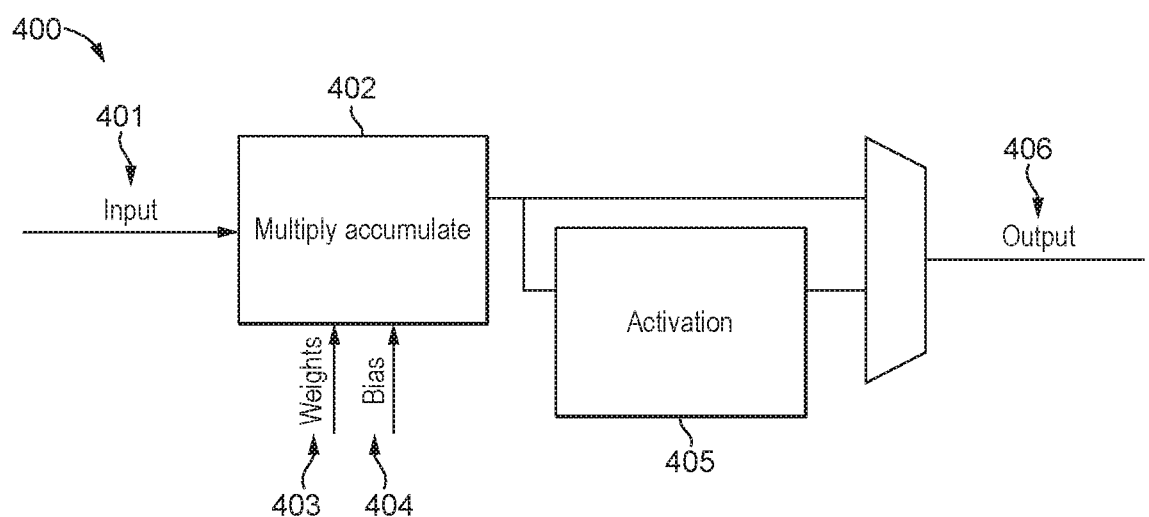
FIG. 6 shows schematically the operation of a fully connected layer of a neural network.

FIG. 6 schematically shows the operation of a fully connected (FC) layer 400 of a neural network. The FC layer 400 may take as an input 401, a feature map that was generated by a previous convolution layer, or an input data array that was generated by a previous FC layer. The FC layer 400 may perform a multiply accumulate operation 402 (using weights 403 and bias 404) on the data array that is input into the FC layer 400. The FC layer 400 may or may not also perform an activation operation 405 e.g. using a suitable non-linear activation function. The FC layer may produce an output 406 (e.g. a data array) which may be used by a next FC layer or an output layer, as discussed above.

Figure 7:
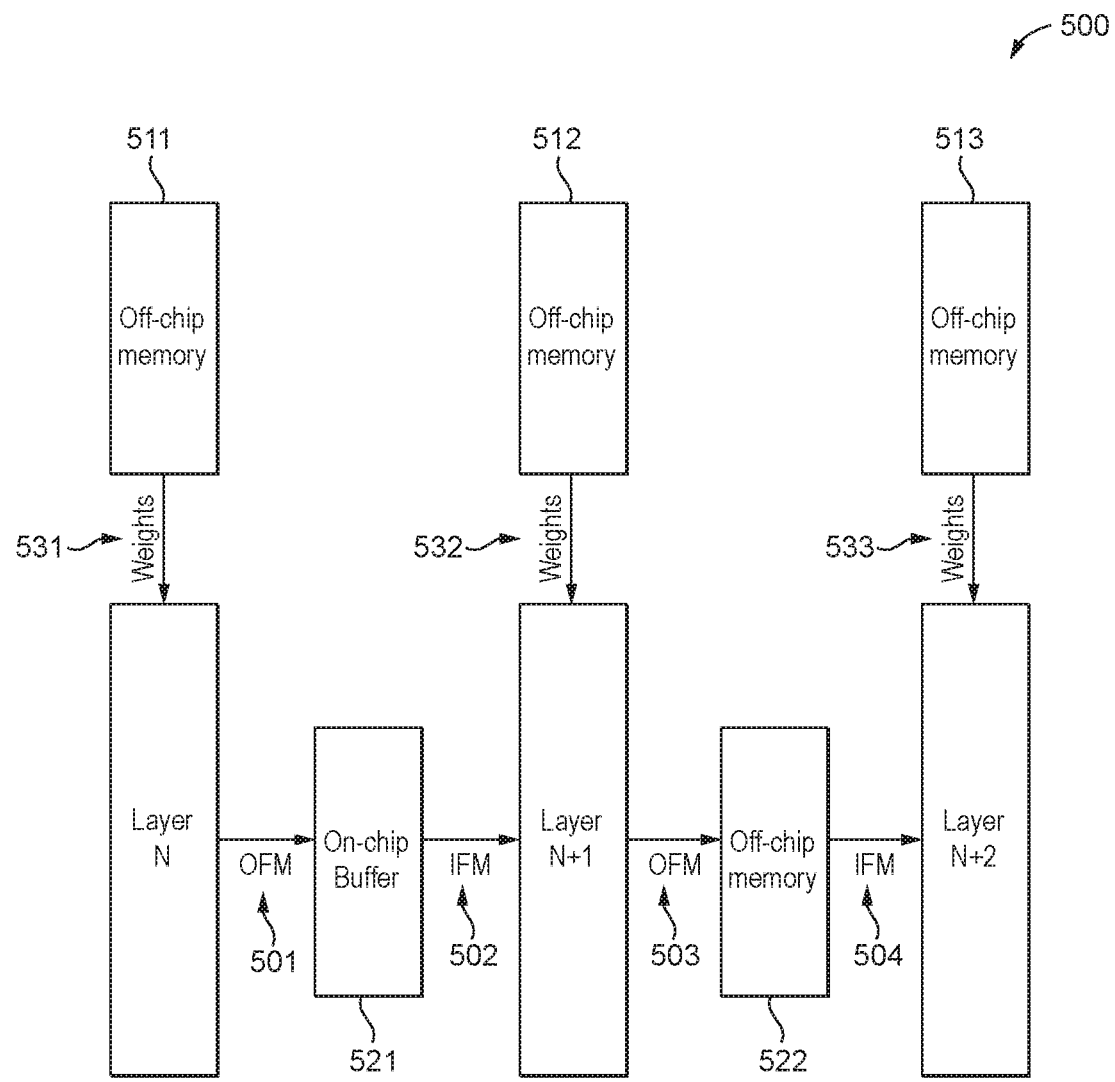
FIG. 7 shows schematically a data flow for layers of an exemplary neural network.

FIG. 7 shows schematically a data flow for the layers of the neural network. The neural network comprises multiple layers N, N+1 and N+2. In the embodiment shown in FIG. 7, layer N generates a data array which comprises an output feature map (OFM) 501, which is small enough to be stored on local memory (on-chip buffer 521). Layer N+1 then reads the data array as an input feature map 502 from the on-chip buffer 521.

Layer N+1 generates another data array which comprises another output feature map (OFM) 503. However, in the case shown, OFM 503 is too large to be stored in local memory, so OFM is stored in main memory (off-chip memory 522).

When the next layer N+2 requires the data array from layer N+1 as an input feature map 504 for the neural network processing performed by layer N+2, then the data array must accordingly be read from off-chip memory.

As shown in FIG. 7, each of the layers N, N+1, N+2 may read processing parameters comprising weights 531-533 (weight arrays) from main (off-chip) memory 511-513. The weights are first read into the local (on-chip) storage for use by the layers.

For neural network processing, e.g. as illustrated in FIGS. 4-8, to be performed by the NPU 5, then, as discussed above, the compiler 22 for the NPU 5 will operate to prepare appropriate commands and data for the NPU 5 to perform the required neural network processing.

Figure 8:
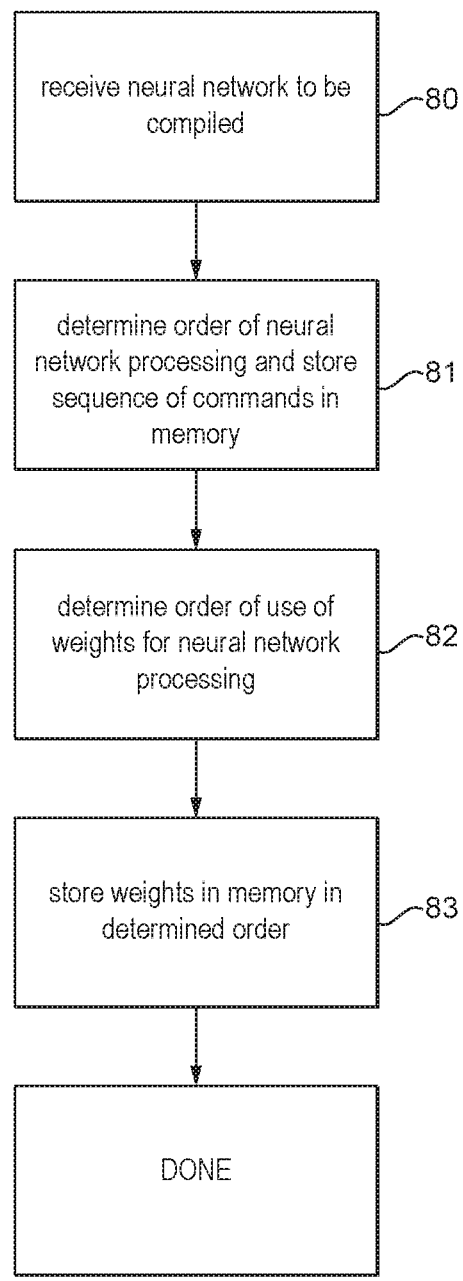
FIG. 8 is a flow chart showing the operation of the driver for a neural network processor in embodiments of the technology described herein.

FIG. 8 is a flow chart showing the operation of the compiler 22 for the NPU 5 in the present embodiments.

This compiler operation may be, and in the present embodiments is in an embodiment, performed in advance of any execution of the neural network itself. This is possible because the network and the target NPU 5 will not normally change for each given execution of the neural network, rather only the network input will change and that will not affect the order in which the network is executed. Accordingly, offline, and in advance, compilation is preferred since the compilation process can be fairly expensive to do, particularly for large and complex networks.

As shown in FIG. 8, the compiler 22 will receive a neural network to be compiled (step 80).

The compiler will then determine the order in which the NPU 5 should perform the required neural network processing, e.g., and in an embodiment based on knowledge of the NPU 5 hardware and how it will operate when executing the neural network. This will include, inter alia, determining the sequence of layers to be executed for the neural network processing, and also, for each layer, the sequence of processing for that layer including, e.g., and in an embodiment, the order in which the input feature map will be traversed when processing the layer.

In the case where the NPU 5 includes plural execution engines (sets of data processing circuits 1001), the compiler 22 will also as part of this operation determine the distribution of the processing for the neural network to the different execution engines of the NPU 5 (and then the processing order, etc., for each execution engine).

Once the order of the neural network processing has been determined, the compiler 22 will store in the off-chip memory 8 an appropriate sequence of commands for execution by the NPU 5, which, when executed in sequence, will cause the NPU 5 to perform the neural network processing in the determined and selected order.

In addition to determining the order of the neural network processing, as shown in FIG. 8, the compiler 22 also operates to determine the order in which the weights (the weight values) for the neural network processing will be needed and used by the NPU 5, based on, and in accordance with, the selected order of the neural network processing that the compiler has determined. Again, the order of use of the weights will be based on, inter alia, the layer sequence for the neural network processing, the processing (traversal) order within the respective layers, and any distribution of the neural network processing to plural execution engines.

Once the order of use of the weights for the neural network processing has been determined, the compiler operates to store the weights in the off-chip memory 8 in the determined order (step 83). In the present embodiments, the weights to be used for the neural network processing will be provided by the application 20 that requires the neural network processing in a particular order (which weights will be stored in the off-chip memory 8 in that particular order), and the compiler 22 will accordingly operate to re-order the weights from the order that they are provided in for the neural network being compiled, to a new, different order based on the determined order that the weights will be used in for the neural network processing. The weights are then stored in the off-chip memory 8 as a continuous stream of weights (at progressively increasing memory addresses) in the new, determined order.

In the present embodiments, the re-ordered weights are first passed through a lossless compressor which compresses the weight values to generate a variable number of bits per weight. The compressed representation of the weights is then packed in the memory 8 so that the compressed weight data is a continuous stream of compressed weights at progressively increasing memory addresses.

In the present embodiments, the compressed weights are packed into fixed size data packets corresponding to a memory transaction burst size, such that each data packet will contain an integer (but potentially variable) number of weight values. If necessary, data packets can be padded with dummy data to allow each data packet to comprises an integer number of weight values.

Once the (compressed) weight values have been stored in the memory, then the memory 8 will contain both an appropriate sequence of commands, and an appropriate sequence of weight values, for use by the NPU 5 when performing the desired neural network processing.

Figure 9:
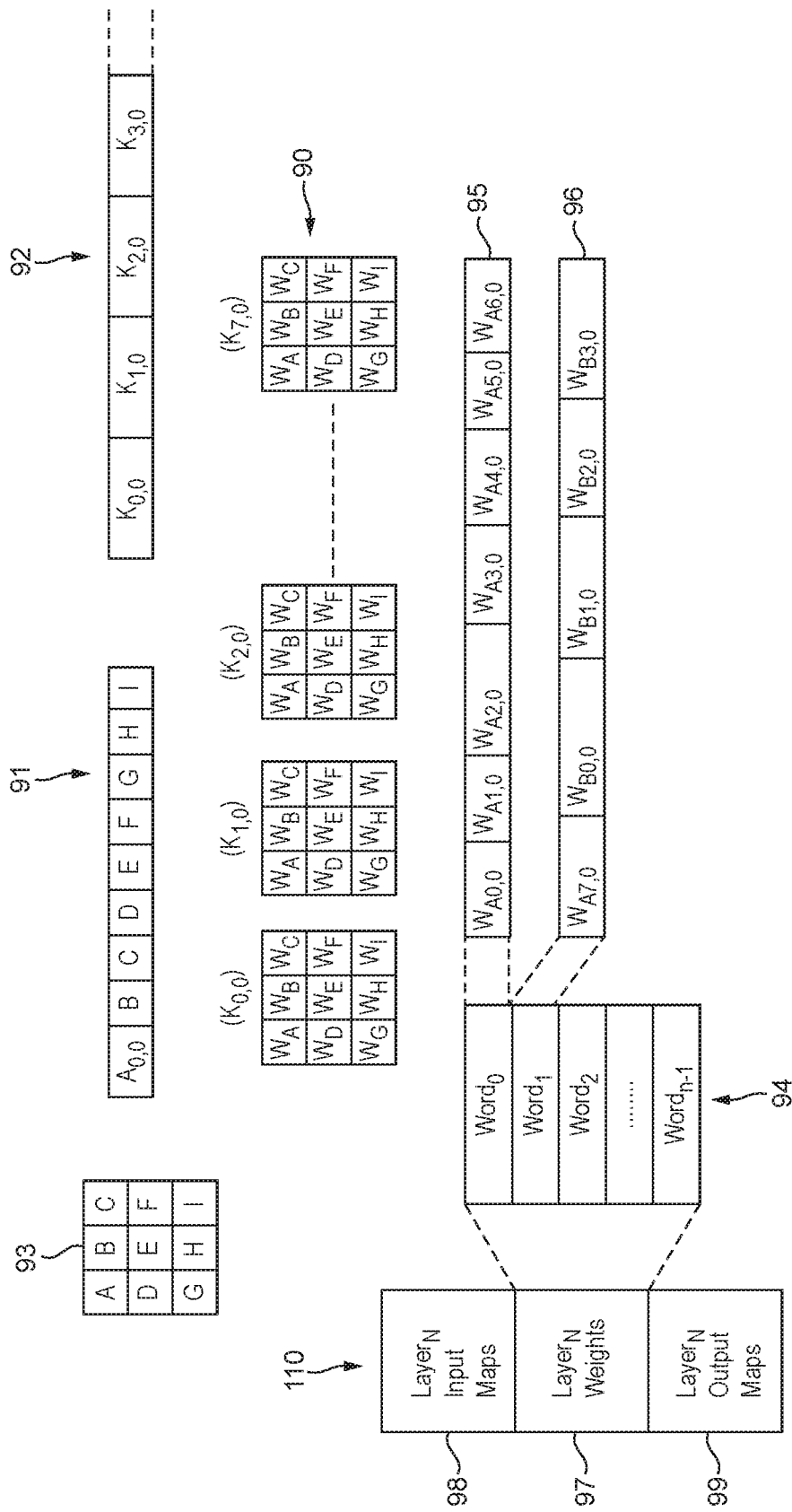
FIG. 9 shows an example of the contents of main (off-chip) memory prepared for executing a neural network in embodiments of the technology described herein.

FIG. 9 shows an exemplary layout of the data in the memory 8 at this stage and is an example of (some of) the contents of main (off-chip) memory 8 that will be prepared by the compiler 22 for the neural network processor 5 to execute a neural network.

In the example shown in FIG. 9, it is assumed that for a given layer N of the neural network, eight input feature maps, $IFM_0$, $IFM_1$, $IFM_2$, ..., $IFM_7$, will be processed to provide an output feature map $OFM_0$. (FIG. 9 only shows the data for one exemplary layer, but as will be appreciated by those skilled in the art, this will be provided for each layer of the neural network processing that is to be performed.)

Furthermore, to generate the output feature map, a respective 3×3 kernel 93 of weights is applied to each input feature map (and then the results combined to give the output feature map).

Thus, as shown in FIG. 9, once the neural network is trained, for this layer N, a set 90 of eight 3×3 weight kernels, $K_{0,0}$, $K_{1,0}$, $K_{2,0}$, ... $K_{7,0}$ will be provided. As shown in FIG. 9, after the training, these kernels will be stored as respective sequences 91 of the (nine) weight values, e.g. in row-major order, with the kernels for the eight input feature maps stored kernel-by-kernel, in sequence, one after another 92. (Correspondingly, for each output feature map (where there is more than one), the corresponding set of IFM kernels are stored in sequence, so all the kernels for OFM0, then the kernels for OFM1, and so on (not shown).)

When the trained neural network is compiled so it can then be executed by the neural network processor, the compiler 22 will, inter alia, and as discussed above, fetch the stored weight values for the trained neural network, re-order those weight values in accordance with the processing order it determines for the neural network, compress the re-ordered weight values, pack the compressed weight values into appropriate data packets, and store the data packets containing the weight values in memory for retrieval by the neural network processor as required.

FIG. 9 shows an example of this, in which the compiler re-orders the weight values from their kernel by kernel sequence 92 to a sequence in which all the weight values for a first position A in the kernels are placed one after another in the kernel order, followed by all the weight values for a next position B from each kernel one after another in the kernel order, and so on (thus the weight values from different kernels are interleaved), and stores the so re-ordered weight values as a sequence of (fixed size) data packets 94, $word_0$, $word_1, \ldots, word_{n-1}$.

Thus, as shown in FIG. 9, a first weight value data packet 95, $word_0$, contains the weight values $W_{A0,0}$, $W_{A1,0}$, $W_{A2,0}$, $WA_{3,0}$, $W_{A4,0}$, $W_{A5,0}$, $W_{A6,0}$, and a second weight value data packet 96, $word_1$, contains the weight values $W_{A7,0}$, $W_{B0,0}$, $W_{B1,0}$, $W_{B2,0}$, $W_{B3,0}$ (and correspondingly for the other weight value data packets, until all the weight values for all the input feature maps have been stored).

It is assumed in FIG. 9 that the re-ordered weight values are compressed using a lossless (and thus variable rate) compression scheme before they are stored in the data packets and that the data packets are of a fixed size (e.g. 64 bytes). Thus, as shown in FIG. 9, each data packet (word) may contain a different number of (compressed) weight values due to the different amount of compression for the weights in each packet.

These weight values are then stored as a set of weights for the layer N of the neural network in the memory 8 for use by the neural network processor.

Once the commands and data for the neural network have been stored in the memory 8, those commands and data can then be used to execute the neural network whenever execution of the neural network in question is required (e.g. by an application that requires neural network processing).

To trigger the neural network processing itself, the driver 21 will trigger the NPU 5 to perform the neural network processing. To do this, the driver 21 sends a signal to the NPU 5 that neural network processing is to be performed, together with any necessary metadata to allow the NPU 5 to retrieve the stored commands and data, including the weight values, for the neural network processing that is to be performed.

Thus the driver will provide to the NPU 5 one or more neural network processing descriptors, e.g., and in an embodiment, indicating the location in memory (e.g. the memory address and size) of the sequence or sequences of commands to be executed to perform the neural network processing, indicating the location in memory (e.g. the memory address and size) of the input data that is to be processed, and indicating the location in memory of (e.g. the start address of and an indication of the size of) the sequence of weight values to be used for the neural network processing. This information will then allow the NPU to retrieve the commands and data that it needs to execute and use to perform the required neural network processing.

Figure 10:
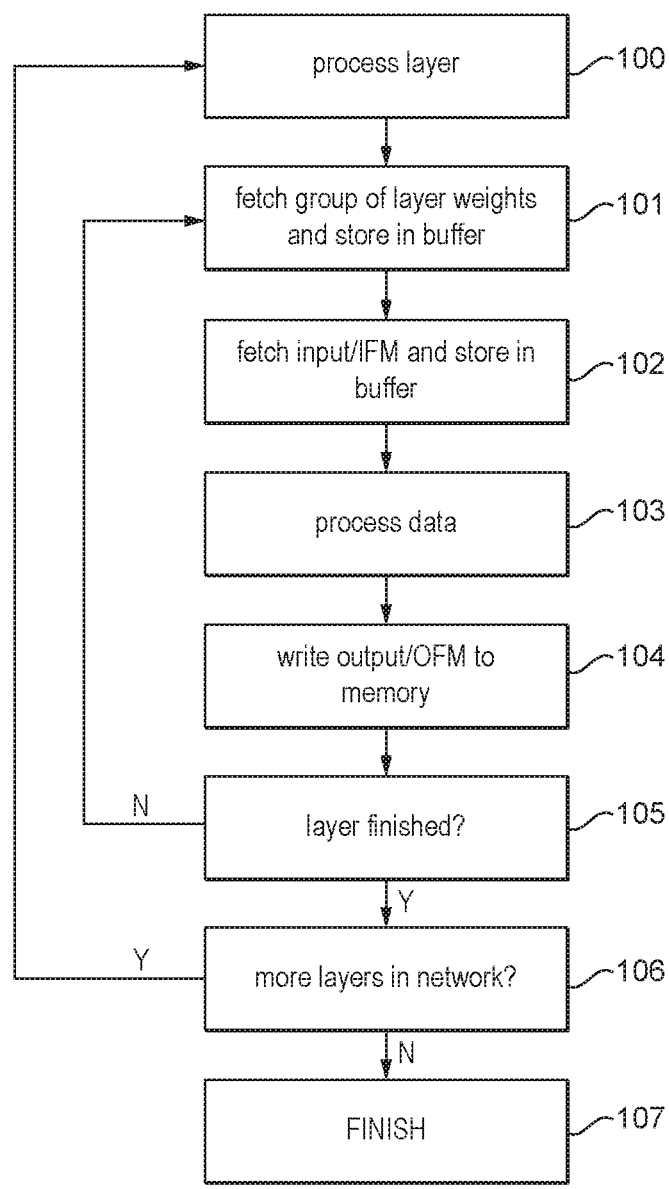
FIG. 10 is a flow chart showing the operation of the neural network processor in embodiments of the technology described herein.

FIG. 10 shows the operation of the NPU 5 when performing the neural network processing using the commands and data prepared by the driver 21 as discussed above in embodiments of the technology described herein.

FIG. 10 shows the processing for a respective layer of the neural network (which processing is accordingly repeated for each layer that is to be processed).

As shown in FIG. 10, the NPU 5 will begin processing a layer of the neural network (at step 100) and will first fetch the next group of layer weights to be used for that layer, decompress those weights, and store them in the local storage (buffer) 1006 (step 101).

The NPU 5 will correspondingly fetch and store in the local buffer 1006 the required input data from the input feature map for the layer that is being processed (and that is to be processed using the group of weights that have been fetched), and store that data in the local storage (buffer) 1006 (step 102).

The NPU 5 will then use the decompressed weight values and the input feature map data stored in the local storage (buffer) 1006 to perform the required neural network processing, and write the corresponding output data (determined output feature map data) to the memory 8 (via the local storage (buffer) 1006) (steps 103 and 104).

As part of this processing, and depending upon the particular layer that is being processed, this operation will comprise, for example, multiplying the relevant input feature map values with the corresponding weight values and, e.g., summing and/or averaging the results to provide a corresponding output feature map data value (which can then be written out). This processing will be performed using the particular group of weights that has been fetched until such time as all the processing that requires that group of weights has been performed.

When reading out the decompressed weights from the fetched group of weights stored in the local storage (buffer) 1006, the NPU 5 may, if necessary, read and use the weight values from the local storage (buffer) 1006 in a different order to the sequence that they are stored in in the local storage, so as to perform some re-ordering of the weight values within the particular group of weight values.

FIG. 9 shows an exemplary memory allocation 110 for the NPU 5 when processing a layer in this manner. As shown in FIG. 9 there will be a memory allocation 98 for the input feature maps for the layer in question, a memory allocation 97 for the weight values for the layer and a memory allocation 99 for the output feature map (s) that are generated. Other arrangements would, of course, be possible.

Once all the processing using the particular group of weight values has been completed, it is then determined whether the processing for the layer in question has been completed (step 105). If the processing for the layer has not been finished, then the process returns to fetch the next group of weights from the memory 8 and to perform the layer processing using that group of weights (steps 101-104), and so on, until the processing of the layer has been finished.

Thus, the NPU 5 will fetch and use successive groups of weights from the memory 8 in the sequence that they are stored in the memory 8 to perform the required layer processing.

Once the layer in question has been finished, it is then determined whether there are more layers to process (step 106) and, if so, those layers are processed in a corresponding manner, as shown in FIG. 10.

Once all the layers have been finished, then the neural network processing will have been completed (step 107), and there should, accordingly, be a desired output stored in the memory 8, e.g. for use by the application that required the neural network processing.

Other arrangements would, of course, be possible.

It can be seen from the above that the technology described herein, in its embodiments at least, provides mechanisms for using weight values when executing a neural network in a more efficient manner, and that, in particular, can reduce the amount of memory traffic, bandwidth, etc., that may be required when performing such operations.

This is achieved, in the embodiments of the technology described herein at least, by (re-)ordering the weight values to be used for the neural network processing based on the order of the neural network processing, such that a processor performing the neural network processing can read the weight values from memory in the sequence that they will be needed and used for the neural network processing.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of performing neural network processing in a data processing system, the data processing system comprising a processor operable to execute a neural network, and a memory for storing data relating to the neural network processing being performed by the processor;
the method comprising:
for neural network processing that uses weight values to be performed by the processor:
determining an order in which the neural network processing is to be performed by the processor;
determining an order in which the processor will use weight values to be used for the neural network processing based on the determined order of the neural network processing;
providing a sequence of commands that when executed will cause the processor to perform the neural network processing in the determined order;
providing the weight values to be used by the processor when performing the neural network processing in the determined order for the weight values, wherein the weight values are provided to the processor by re-ordering the weight values based on the determined order for the weight values, and storing the re-ordered weight values in memory in a compressed form using a variable rate compression scheme;
and
when the processor is to perform the neural network processing:
the processor:
executing the commands to perform the neural network processing in the determined order; and the processor, when performing the neural network processing in response to the commands, reading the weight values from the memory where they are stored re-ordered in the compressed form according to the variable rate compression scheme, and using the weight values in the determined order.

2. The method of claim 1, wherein the determining of the order in which the processor will use the weight values is based on one or more of:
an order of processing of respective layers in the neural network when performing the neural network processing; and
a processing order within each layer of the neural network when performing the neural network processing.

3. The method of claim 1, wherein the processor that is executing the neural network includes more than one execution circuit for neural network processing, and the determining of the order in which the processor will use the weight values is based on a distribution of the neural network processing to the more than one execution circuits.

4. The method of claim 1, wherein the determining of the order in which the processor will use the weight values comprises:
determining an order for respective groups of the weight values relative to each other based on the determined order of the neural network processing.

5. The method of claim 1, wherein:
the weight values are provided to the processor in the determined order for the weight values by storing the weight values in memory as a sequence of weight values in the determined order for the weight values; and
the method comprises:
the processor, when performing the neural network processing:
reading the weight values from the memory where they are stored at progressively increasing addresses until an end of the sequence of weight values is reached.

6. The method of claim 1, wherein the weight values are provided to the processor in the determined order for the weight values by storing respective groups of the weight values in memory as a sequence of weight value groups in a determined order for the weight value groups, from where they can then be read by the processor for use; and
wherein each group of weight values occupies a same-sized data packet in its form as stored in the memory for providing to the processor.

7. The method of claim 1, comprising the processor, when performing the neural network processing:
storing a group of the weight values provided for the neural network processing in storage accessible to the processor in a first order of the weight values in the group of weight values; and
then reading the weight values of the group from the storage for use when performing the neural network processing in a different order of the weight values in the group to the order that they are stored in in the storage.

8. A data processing system operable to perform neural network processing, the data processing system comprising:
a processor operable to execute a neural network; and
a memory for storing data relating to the neural network processing being performed by the processor;
the data processing system further comprising a processing circuit configured to:
when neural network processing that uses weight values is to be performed by the processor:

determine an order in which the neural network processing is to be performed by the processor;

determine an order in which the processor will use weight values to be used for the neural network processing based on the determined order of the neural network processing;

provide a sequence of commands that when executed will cause the processor to perform the neural network processing in the determined order; and provide the weight values to be used by the processor when performing the neural network processing in the determined order for the weight values, wherein the weight values are provided to the processor by re-ordering the weight values based on the determined order for the weight values, and storing the re-ordered weight values in memory in a compressed form using a variable rate compression scheme;

and wherein:

the processor is configured to:

execute the commands to perform the neural network processing in the determined order; and when performing the neural network processing in response to the commands, read the weight values from the memory where they are stored re-ordered in the compressed form according to the variable rate compression scheme, and use the weight values in the determined order that they are provided in.

9. The system of claim 8, wherein the determining of the order in which the processor will use the weight values is based on one or more of:

an order of processing of respective layers in the neural network when performing the neural network processing; and a processing order within each layer of the neural network when performing the neural network processing.

10. The system of claim 8, wherein the processor includes more than one execution circuit for neural network processing, and the determining of the order in which the processor will use the weight values is based on a distribution of the neural network processing to the more than one execution circuits.

11. The system of claim 8, wherein the determining of the order in which the processor will use the weight values comprises:

determining an order for respective groups of the weight values relative to each other based on the determined order of the neural network processing.

12. The system of claim 8, wherein:

the weight values are provided to the processor in the determined order for the weight values by storing the weight values in memory as a sequence of weight values in the determined order for the weight values; and the processor is configured to, when performing the neural network processing:

read the weight values from the memory where they are stored at progressively increasing addresses until an end of the sequence of weight values is reached.

13. The system of claim 8, wherein the weight values are provided to the processor in the determined order for the weight values by storing respective groups of the weight values in memory as a sequence of weight value groups in a determined order for the weight value groups, from where they can then be read by the processor for use.

14. The system of claim 13, wherein each group of weight values occupies a same-sized data packet in its form as stored in the memory for providing to the processor.

15. The system of claim 13, wherein the processor is configured to, when performing the neural network processing:

read successive weight value groups from the memory where they are stored in the order of the stored weight value groups until an end of the sequence of weight value groups is reached.

16. The system of claim 8, wherein the processor comprises storage in which the weight values can be stored, and from which the weight values can be read for use in a manner so as to permit re-ordering of the weight values stored in the storage.

17. A processor operable to execute a neural network, the processor comprising:

a processing circuit configured to execute a sequence of commands to cause the processor to perform neural network processing in a determined order; and a processing circuit configured to, when performing neural network processing in response to the commands, use, in a determined order, a sequence of weight values that have been provided in the determined order for the weight values, wherein the weight values are provided to the processor by re-ordering the weight values based on the determined order for the weight values, and storing the re-ordered weight values in memory in a compressed form using a variable rate compression scheme.

18. A non-transitory computer readable storage medium storing software code which when executing on a processor performs a method of compiling a neural network to be executed by a processor operable to execute a neural network;

the method comprising:

for a neural network that uses weight values to be executed by a processor:

determining an order in which the neural network processing is to be performed by the processor;

determining an order in which the processor will use weight values to be used for the neural network processing based on the determined order of the neural network processing;

and providing a sequence of commands that when executed will cause the processor to perform the neural network processing in the determined order; and providing the weight values to be used by the processor when performing the neural network processing in the determined order for the weight values, wherein the weight values are provided to the processor by re-ordering the weight values based on the determined order for the weight values, and storing the re-ordered weight values in memory in a compressed form using a variable rate compression scheme.

* * * * *